(No Model.)
C. B. COX.
DUMB WAITER SAFETY CLUTCH.
No. 592,698. Patented Oct. 26, 1897.
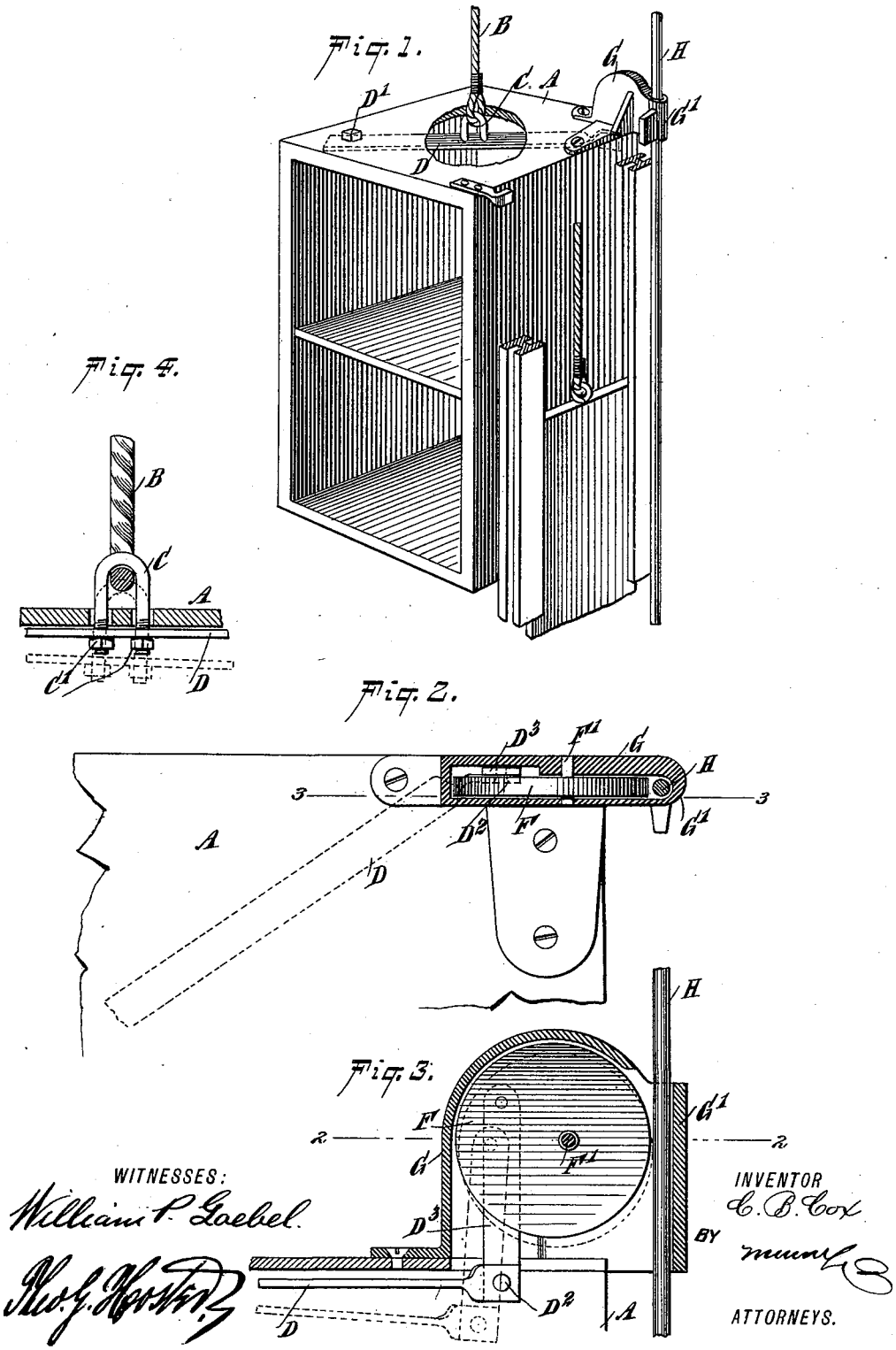
WITNESSES:
William P. Gaebel.
INVENTOR
C. B. Cox
ATTORNEYS.

UNITED STATES PATENT OFFICE.

CHARLES B. COX, OF NEW YORK, N. Y.

DUMB-WAITER SAFETY-CLUTCH.

SPECIFICATION forming part of Letters Patent No. 592,698, dated October 26, 1897.

Application filed November 23, 1896. Serial No. 613,121. (No model.)

*To all whom it may concern:*

Be it known that I, CHARLES B. COX, of New York city, in the county and State of New York, have invented a new and Improved Dumb-Waiter Safety-Clutch, of which the following is a full, clear, and exact description.

The object of the invention is to provide a new and improved dumb-waiter safety-clutch which is simple and durable in construction and arranged to securely hold the cage in place in case of the breaking of the supporting rope or cable.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1 is a perspective view of the improvement as applied and with parts in section. Fig. 2 is a large sectional plan view of the improvement on the line 2 2 of Fig. 3. Fig. 3 is a sectional side elevation of the same on the line 3 3 of Fig. 2; and Fig. 4 is an enlarged side elevation of the fastening device for the rope or cable, part being in section.

The improved safety-clutch, as illustrated in the drawings, is arranged on a cage A of the usual construction and supported on the counterbalance-supporting rope or cable B, having its lower end connected with a staple C, attached to a plate or arm D, extending under the top of the cage A and secured thereto at one end by a bolt D', as is plainly shown in Fig. 1. The free end of the plate D is pivotally connected at $D^2$ with a link $D^3$, pivoted on one side of a clamping-arm F, preferably made in the shape of a disk, mounted eccentrically on a shaft F', turning in suitable bearings in the sides of the casing G, secured to the top of the cage A at one corner thereof, as is plainly shown in the drawings.

The casing G is provided with a vertically-disposed guide G', through which passes loosely a rod, rope, or the like H, secured in the shaft in which the cage A is running, the said rod being adapted to be engaged by the peripheral face of the disk F whenever the rope or cable B breaks.

Now it will be seen that when the several parts are in the position illustrated in Figs. 1, 2, and 3 the disk F is out of engagement with the rod H. Consequently the cage A can be moved up or down in the shaft in the usual manner. Now in case the rope or cable B breaks the plate D, which is made of spring metal, swings downward into the position shown in dotted lines in Fig. 3, whereby a turning motion is given to the disk F, and the latter is moved with its peripheral face in contact with the rod H, extending through the guide G', and thus the disk F in connection with the guide G' clutches the fixed rod H, so as to securely hold the cage A in position, as soon as the rope or cable B is broken.

By reference to Fig. 3 it will be seen that the heavier the load in the cage A the more firmly the disk F will move in contact with the rod H, as the downward pull of the cage A has a tendency to draw the peripheral face of the eccentric disk F in contact with the rod H.

The connection of the eye C with the spring-plate D is preferably as shown in Fig. 4—that is, by means of nuts C', engaging the under side of the spring-plate, so that by adjusting the nuts the position of the plate D can be regulated to hold the disk F more or less with its peripheral face from the rod H.

It will be seen that by the arrangement described the cage A is securely held in place in the shaft whenever the rope or cable B breaks, so that accidents by the downward movement of the cage are prevented.

It is evident that the device may be used in passenger and freight elevators of any construction.

Having thus described my invention, I claim as new and desire to secure by Letters Patent—

1. A dumb-waiter safety-clutch, comprising a vertically-disposed rod fixed in the shaft, a casing held on the cage and forming a guide for the said rod, a clamping device journaled in the said casing and adapted to engage the said rod to clamp the latter in the casing, and a spring-plate secured at one end to the cage and connected at its other end with the said clamping device, the said plate being connected with the operating rope or cable for the cage, substantially as shown and described.

2. A dumb-waiter safety-clutch, comprising a vertically-disposed rod fixed in the shaft, a casing adapted to be secured on the cage and formed with a guideway for the said rod, a clamping device journaled in the said casing and adapted to engage the said rod and clamp the latter to the casing, a spring-plate connected with the said clamping device and attached to the cage, and a staple adjustably held on the said spring-plate and connected with the supporting rope or cable for the cage, substantially as shown and described.

CHARLES B. COX.

Witnesses:
 THEO. G. HOSTER,
 A. A. HOPKINS.